United States Patent
Yancy

(10) Patent No.: US 8,702,989 B2
(45) Date of Patent: Apr. 22, 2014

(54) METHOD AND COMPOSITION FOR ENVIRONMENTAL CLEAN UP

(76) Inventor: Donald Lane Yancy, Woodbury, TN (US)

(*) Notice: Subject to any disclaimer, the term of this patent is extended or adjusted under 35 U.S.C. 154(b) by 392 days.

(21) Appl. No.: 12/828,860

(22) Filed: Jul. 1, 2010

(65) Prior Publication Data

US 2012/0000856 A1    Jan. 5, 2012

(51) Int. Cl.
  *B01J 49/00* (2006.01)
  *C02F 1/28* (2006.01)
  *C02F 101/32* (2006.01)
  *B01D 17/02* (2006.01)

(52) U.S. Cl.
  CPC .......... *C02F 1/288* (2013.01); *C02F 2101/32* (2013.01); *B01D 17/0202* (2013.01); *Y10S 210/924* (2013.01); *Y10S 210/925* (2013.01)
  USPC ........ 210/671; 210/680; 210/693; 210/502.1; 210/924; 210/925

(58) Field of Classification Search
  CPC ....... C09K 3/32; C02F 1/681; C02F 2101/32; C02F 1/288; B01D 17/0202
  USPC ............... 210/671, 680, 693, 502.1, 924, 925
  See application file for complete search history.

(56) References Cited

U.S. PATENT DOCUMENTS

| | | | |
|---|---|---|---|
| 3,862,963 A * | 1/1975 | Hoshi et al. | 502/402 |
| 4,008,160 A * | 2/1977 | Vadekar et al. | 210/693 |
| 4,039,489 A | 8/1977 | Fletcher et al. | |
| 4,210,567 A | 7/1980 | Kosters | |
| 4,420,573 A | 12/1983 | Fogg et al. | |
| 5,092,911 A | 3/1992 | Williams et al. | |
| 5,641,847 A | 6/1997 | Hozumi et al. | |
| 6,143,172 A | 11/2000 | Rink et al. | |
| 6,841,077 B2 | 1/2005 | Gannon et al. | |
| 7,381,768 B2 | 6/2008 | Wiercinski et al. | |
| 2001/0002386 A1 | 5/2001 | Steele et al. | |

* cited by examiner

*Primary Examiner* — Chester Barry

(74) *Attorney, Agent, or Firm* — Akerman LLP

(57) ABSTRACT

A method and absorbent material for cleaning up contaminants, such as a petroleum-based product, with little to no water absorption. The absorbent material may include sheets, disks, or spheres of polymer-based plastic material of one to two inches thick that is manufactured and pre-conditioned to enhance absorption characteristics. The absorbent material may include smaller sieve sizes ranging from 16 to 100 that facilitate absorption and collection of a petroleum-based contaminant. Alternatively or additionally, the absorbent material may include larger sieve sizes ranging from 4 to 10 that facilitate transfer of the petroleum-based contaminant to the surface of the absorbent material. The absorbent material may be deployed at sea for a matter of minutes, and after absorbing a portion of the petroleum-based contaminant, then recovered by a recovery vessel, such as via netting, scooping, and/or vacuuming means. After which, the petroleum-based contaminant may be extracted from the absorbent material for re-use.

20 Claims, 6 Drawing Sheets

METHOD AND COMPOSITION FOR ENVIRONMENTAL CLEAN UP

BACKGROUND OF INVENTION

1. Field of the Invention

The present invention relates to environmental clean ups, and more particularly to a polymer-based molded plastic configured to absorb contaminants.

2. Description of the Related Art

Conventional methods for responding to environmental spills include those of U.S. Pat. No. 4,420,573, which discloses a method of treating salt water-in-oil dispersions that includes mixing with the dispersion a latex of a rubber having a high wet gel strength, and U.S. Pat. No. 6,143,172, which discloses a method for ameliorating hydrocarbon spills in marine and inland waters.

Conventional absorbents include that of U.S. Pat. No. 7,381,768, which discloses a composition having a hydrophobic polymer phase and a water-swollen super absorbent polymer phase. Also, U.S. Pat. No. 6,841,077 discloses a hydrocarbon absorbing polymeric absorbent; U.S. Pat. No. 4,039,489 discloses a polymer system and method for absorbing fats or oils; and U.S. Publication No. 2001/0002386 discloses a granular absorbent based on calcium sulfate that may be used for absorbing oil and water-based liquids.

However, conventional compositions and methods may have various shortcomings. For instance, conventional compositions may have limited oil absorption capabilities. Conventional methods may be impractical to carry out on a large scale or may not be able to remove a satisfactory amount of contaminant from the environment.

SUMMARY OF THE INVENTION

The present embodiments are directed to a method and composition for removing petroleum-based products and other contaminants from water with little to no water absorption. The composition may be an absorbent material, such as a PVC polymer-based molded plastic. The absorbent material may be manufactured and/or pre-conditioned to enhance absorbency. The absorbent material may be deployed at sea for a short period of time and allowed to absorb a contaminant in the water. After which, the absorbent material may be retrieved, such as onto a barge or boat. The contaminant absorbed into the absorbent material may then be extracted for re-use.

In one aspect, an absorbent material for the removal of petroleum-based products from water with little to no water absorption may be provided. The absorbent material may include a sheet of polyvinyl chloride (PVC) polymer-based plastic. The sheet of PVC polymer-based plastic may include at least approximately seventy percent PVC polymer with the remainder including a non-zero percentage of both inert filler and an acrylic compound. The sheet of PVC polymer-based plastic may have a thickness of between approximately one inch and approximately two inches and may be configured to float on water. The sheet of PVC polymer-based plastic may further have sieve sizes between approximately sixteen and approximately one-hundred such that when the sheet of PVC polymer-based plastic is deployed on top of a body of water containing a petroleum-based product, the sheet of PVC polymer-based plastic may absorb the petroleum-based product from the body of water with little to no water absorption and retain the petroleum-based product for at least approximately thirty minutes before the sheet of PVC polymer-based plastic will lose buoyancy, allowing for recovery of the sheet of PVC polymer-based plastic from or near the surface of the body of water.

In another aspect, a method of extracting a petroleum-based product from water with little to no absorption of water may be provided. The method may include deploying a sheet of polyvinyl chloride (PVC) polymer-based plastic configured to float on water onto a body of water containing a petroleum-based product. The sheet of PVC polymer-based plastic may include at least approximately seventy percent PVC polymer and have a thickness of between approximately one inch and approximately two inches. The sheet of PVC polymer-based plastic may further have sieve sizes between approximately sixteen and approximately one-hundred such that when the sheet of PVC polymer-based plastic is deployed on top of the body of water containing the petroleum-based product, the sheet of PVC polymer-based plastic will absorb the petroleum-based product from the body of water with little to no water absorption while the sheet of PVC polymer-based plastic remains buoyant for a period of time. The method may include waiting a sufficient period of time to allow the sheet of PVC polymer-based plastic to absorb a portion of the petroleum-based product from the body of water, and then recovering the sheet of PVC polymer-based plastic from the body of water after the sheet of PVC polymer-based plastic has become at least partially saturated with the petroleum-based plastic such that the portion of the petroleum-based product absorbed by the sheet of PVC polymer-based plastic is extracted from the body of water.

In another aspect, a method of extracting a contaminant from water with little to no absorption of water may be provided. The method may include pre-conditioning a sheet of polyvinyl chloride (PVC) polymer-based plastic for extracting a contaminant from a body of water by cutting the sheet of PVC polymer-based plastic to open the absorption pores of the sheet of PVC polymer-based plastic and facilitate absorption of the contaminant by the sheet of PVC polymer-based plastic. The sheet of PVC polymer-based plastic may include at least approximately seventy percent PVC polymer and have a thickness of between approximately one inch and approximately two inches. The method may further include deploying the sheet of PVC polymer-based plastic onto the body of water containing the contaminant; waiting a sufficient period of time to allow the sheet of PVC polymer-based plastic to absorb a portion of the contaminant from the body of water with little to no water absorption and while the sheet of PVC polymer-based plastic remains buoyant; and then recovering the sheet of PVC polymer-based plastic from the body of water after the sheet of PVC polymer-based plastic has absorbed at least a portion of the contaminant. As a result, the portion of the contaminant absorbed by the sheet of PVC polymer-based plastic may be extracted from the body of water with little to no absorption of water by the sheet of PVC polymer-based plastic.

In another aspect, a method of extracting a contaminant from water with little to no absorption of water may be provided. The method may include deploying a sheet of polyvinyl chloride (PVC) polymer-based plastic configured to float on water onto a body of water containing a contaminant. The sheet of PVC polymer-based plastic may include compressed material having sieve sizes between approximately four and approximately ten and a thickness of approximately equal to or greater than a thickness of contaminants in the body of water such that when the sheet of PVC polymer-based plastic is deployed on top of the body of water containing the contaminant, the sheet of PVC polymer-based plastic absorbs contaminant from the body of water with little to no water absorption while remaining buoyant. The method may further include waiting a sufficient period of time to allow the sheet of PVC polymer-based plastic to absorb at least a portion of the contaminant from the body of water; and recovering the sheet of PVC polymer-based plastic from the body of water after the sheet of PVC polymer-based plastic has absorbed at least a portion of the contaminant with little to no absorption of water. As a result, the portion of the contaminant absorbed by the sheet of PVC polymer-based plastic is removed from the body of water.

The present invention is defined by the following claims. Nothing in this section should be taken as a limitation on those claims. Further aspects and advantages of the invention are discussed below in conjunction with the preferred embodiments and may be later claimed independently or in combination.

DESCRIPTION OF THE DRAWINGS

The present embodiments will become more fully understood from the detailed description given herein below and the accompanying drawings which are given by way of illustration only, and are not limitative of the present invention, and wherein.

DETAILED DESCRIPTION OF THE DRAWINGS

Figure 1:
FIG. 1 illustrates an exemplary sheet of absorbent material configured to absorb petroleum-based products with little or no water absorption.

The embodiments described herein include methods and compositions for the removal of contaminants from the environment, such as for use during an oil spill clean-up. A polymer-based absorbent material may be used to remove petroleum-based products or other contaminants from water with little to no water absorption.

The polymer-based absorbent material may be a PVC polymer-based molded plastic. The method may include pre-conditioning the absorbent material to enhance absorption characteristics. The method may include deploying the absorbent material at sea to absorb petroleum-based products or other liquids. The method may also include recovering the absorbent material and then extracting the petroleum-based product from the absorbent material. The method may be used in fresh water, salt water, or other environments.

I. Polymer-Based Absorbent Material

In one embodiment, the composition of absorbent material may be that identified in Table I below. Preferably, the composition may comprise: (1) PVC polymer: 70-95%; (2) inert filler: 0-30% CaCO3 TiO2; (3) heat stabilizer: 0-2% organotin compounds; (4) lubricants: 0-4% calcium steartrate; paraffin, polyethylene, polyamide compounds, or esters; (5) process aids: 0-2% acrylic compounds; (6) impact modifiers: 0-10% CPE (cytoplasmic polyadenylation element), ABS (acrylonitrile butadiene styrene), MBS (molecular beam epitaxy) or acrylic compounds; (7) colorants: 0-2% white organic or inorganic; and (8) chemical blowing agents: 0-1% azo compounds or sodium bicarbonate. Other compositions may be used, including those with alternate percentages and/or having additional, fewer, or alternate materials.

TABLE I

Composition Make-Up

| Material | Percentage |
| --- | --- |
| PVC Polymer | 70-95% |
| Inert Filler | 0-30% CaCO3TiO2 |
| Heat Stabilizer | 0-2% Organotin Compounds |
| Lubricants | 0-4% Calcium Steartrate; Parafin, Polyethylene, Polyamide Compounds, or Esters |
| Process Aids | 0-2% Acrylic Compounds |
| Impact Modifier | 0-10% CPE, ABS, MBS or Acrylic Compounds |
| Colorants | 0-2% White Organic or Inorganic |
| Chemical Blowing Agents | 0-1% Azo Compounds or Sodium Bicarbonate |

In one embodiment, the composition described above may be fed in 4×8 feet sheets into a machine to be processed or pre-conditioned to enhance absorption characteristics. Other sheet sizes may be used and pre-conditioned, including smaller sheets configured as disks, squares, spheres, globes, or other shapes. For example, a small sheet may be a one foot by one foot patch, a larger sheet may be hundreds of feet in length and/or width, and/or spheres of absorbent material may be approximately 1.50 to approximately 2.50 inches in diameters. Other sizes may be used. The machine may include half inch or other size saw blades covering a five foot wide or other area. The saw blades may turn at 10,000 RPM or other speeds. A variable speed motor may control the feed of absorbent material into the saw blades.

The end result of the pre-conditioning may be a plastic that holds the absorption pores of the plastic open for the extraction of oil or other contaminants from the environment. In addition to the composition of Table I above, other plastics may be used, including, but not limited to, other types of polyvinyl chloride (PVC), such as PVC commercially available from Celtic Marine Corporation® or other suppliers, including King Starboard® or Vycom® (including Vintec I and Vintec II).

II. Exemplary Testing

Experimentation has revealed that polymer-based absorbent material with sieve sizes of between 16, 20, 40, 60, and 100 may absorb oil from salt water and maintain it for a period of approximately 30 minutes before losing buoyancy. As the material absorbs more and more oil, it may change composition, expand, and/or lose cohesiveness. After about 30 minutes, the oil saturated material may begin to break up and sink in clumps if not retrieved or contained by a containment absorbent mesh-like material.

The inventor performed testing using a variety of mesh-like materials available. The testing revealed that the mesh-like material with the least amount of leeching upon removal may be the same material commonly used for medical hairnets.

During testing, it was further observed that the absorbent material preferably is not made to be too thick, otherwise effectiveness may be degraded. The consistency of the absorbent material to water & oil ratios may determine the amount of saturation achievement.

Polymer-based absorbent material with larger sieve sizes of 4 and 10 may also be used. The absorbent material with larger sieve sizes may have a flake/shavings consistency, and may be made using a shaving action. During testing, the flakes/shavings that came in contact with heat tended to clump together and form a floating mass in which even more absorbent pores were opened up—which in turn may allow for a faster absorption rate. The sieve size 4 and 10 particulates may absorb or suck the oil from water at a much faster rate than the absorbent material with smaller sieve sizes.

The sieve size 4 and 10 particulates may allow the oil, or a portion of the oil, to pass through the absorbent material and move to the top of the material (depending on the thickness of the absorbent material applied). On the other hand, the smaller particulates (such as sieve size's 16, 20, 40, 60, and 100) may absorb or capture the oil and hold the oil for retrieval. When the sieve size 4 and 10 material has pressure applied, the oil may be absorbed at an even faster rate, including absorption by the smaller particulates.

The sieve size 4 and 10 particulates may stay buoyant throughout absorption—even during agitation of water (such as waves and bad weather). The sieve size 4 and 10 material may even stay afloat after becoming saturated with oil. In one embodiment, the sieve size 4 and 10 material may hold the smaller particulates in place such that when agitation does occur, there may be less than 1% loss of any particulate size.

In another embodiment, the material may be made into sheets using heat to compress the sieve size 4 and 10 particulates into larger masses, such as sheets ranging from one inch by one inch in size and greater. As a result, any loss of particulates during any agitation of the water may be alleviated.

The results of various testing revealed that for 150 ml of salt-water, 0.5 ounces of sieve size 10 to 100 particulates absorbed 25 ml of 145 weight oil from water in approximately 15 minutes. The testing also showed that for 150 ml of salt water, 0.2 ounces of sieve size 4 and 10 particulates placed under 0.2 ounces of sieve size 16 to 100 particulates absorbed 0.25 ml of 145 weight oil in 3 minutes, and when agitated by stirring, less than 1% of the sieve size 10 to 100 particulates (i.e., only a few loose grains) dropped.

Table II below is a Particulate Size Chart. The Particulate Size Chart is based on a one pound sample of mixed material having sieve sizes ranging among 4, 10, 16, 20, 40, 60, and 100, or their approximates.

TABLE II

Particulate Size Chart

| SIEVE SIZE | MATERIAL SIZE (INCHES) | MATERIAL SIZE (MM) | % RETAINED |
|---|---|---|---|
| #4 | .187 inches | 4.75 mm | 1-5 |
| #10 | .0787 inches | 2.00 mm | 25-30 |
| #16 | .0469 inches | 1.18 mm | 15-18 |
| #20 | .0331 inches | 850 micrometers | 10-15 |
| #40 | .0165 inches | 425 micrometers | 15-20 |
| #60 | .0098 inches | 250 micrometers | 5-10 |
| #100 | .0059 inches | 150 micrometers | 8-15 |
| DUST | 0 | 0 | 0-5 |

III. Deployment and Retrieval Options for Absorbent Material

Absorbent material having sieve sizes ranging between approximately 16, 20, 40, 60, and 100 preferably may be deployed in sheets of approximately one to approximately two inches in thickness. The preferably thickness may depend on the type of contaminant being absorbed. In order to absorb the contaminant, the material may be laid out flat in an quantified amount in relation to or approximately equal to the amount of contaminant being retrieved.

The absorbent material may efficiently absorb if deployed in an optimum amount. For instance, if too little or too thin absorbent material is used, the contaminant may leach through a containment mesh. If too much or too thick absorbent material is used, there may be excess dry absorbent material left over or wasted.

The size of the sheet of absorbent material may be based upon on the size or scope of the spill the sheet is intended to clean up. The size of the sheet may be flexible and the sheet may be sized to move with water agitation and/or waves in larger settings.

Additionally, the type and size of absorbent material to be deployed may be determined based on what type of spill or contaminant is to be absorbed. As for use on a large scale, the absorbent material may be deployed in various manners. The absorbent material may be configured as large sheet or smaller sheets comprising disks, squares, spheres, globes, or other patches. The absorbent material may be deployed using a ship with a grate and winch attachment, with buoys, or dragged between two ships. Alternatively, a modified seaweed harvester or other vessel configurations and manners of deployment may be used.

For example, in one embodiment, the absorbent material may include loose sieve material and/or small sheets such as disks or squares having sieve sizes ranging between four and one-hundred. The method of deployment may involve scattering the loose sieve material and/or small sheets over the spill over and may be carried out manually, or via ship, boat, plane, or straw blower, or any other means in which the absorbent material comes in contact with the contaminant. Preferably, the area in which absorbent material is to be applied may be boomed off. Field dispersement calculations may be performed on-site to calculate an appropriate amount of absorbent material needed to apply and at what thickness the absorbent material should be deployed in order to achieve optimal absorption results for the given conditions.

Once the absorbent material has been deployed for the requisite amount of time, there may be several retrieval options. A hand sieve or netting type of material may be pre-stretched over the area of application and pulled onto a ship or barge using attached loops on the submersed material (similar to catching fish in a net on a ship). Alternatively or additionally, a ship with a 360 degree crane with a scope may be used to retrieve contaminant saturated absorbent material. The scoop may travel beneath the surface of the water and the absorbent material and transfer the captured absorbent material to a vessel or barge. The scoop may be affixed with a device that provides an assisting suction action for retrieving the absorbent material from the water.

Another embodiment for deployment and retrieval may be an all-in-one unit designed to deploy and retrieve the same absorbent material within 15 minute or other intervals. As a vessel travels along, it may pull the all-in-one unit that is configured to dispense the absorbent material in a needed thickness over the contaminated area. Once the absorbent material is deployed and captures contaminant, the all-in-one unit may retrieve the same absorbent material a short period of time later, such as 15 or 30 minutes or other period sufficient to allow the absorbent material time to absorb contaminant.

The all-in-one unit may have two compartments. A dispensing compartment may be used to store and/or dispense fresh absorbent material. A holding compartment may be used to retrieve and/or hold saturated absorbent material. The absorbent material may be collected using a manually operated scrapper blade or other moving device configured to grab the absorbent material and push or otherwise move it into the holding compartment. The holding compartment may then store the contaminated material for transfer and subsequent reclamation of contaminant from the absorbent material. A vacuuming or suction device may be used in conjunction with the scrapper blade to facilitate absorbent material reclamation.

In one embodiment, sheets or disks of compressed absorbent material may be used. The sheets or disks may include shavings of sieve sizes 4 and 10. Preferably, the sheets may have a thickness equal too or greater than the thickness of the contaminant in the water. Smaller particle sizes may be placed over shavings to absorb and clump the contaminants or petroleum-based product(s) together, and hold the absorbent material together. As a result, little to no oil may be left behind in the environment. The absorbent material with larger sieve sizes may be able to absorb contaminant to the surface of the absorbent material in a fraction of the time that absorbent material with smaller sieve sizes may require. The absorbent material with larger sieve sizes may also be able to withstand waves and agitation much longer than absorbent material with smaller sieve sizes.

IV. Retrieval of Contaminant from Absorbent Material

In order to retrieve petroleum-based product, such as oil, or other contaminant from the absorbent material, the absorbent material may be filled into a container with holes in the bottom and a force may be applied to squeeze the captured petroleum-based product or other contaminant from the absorbent material. In one embodiment, the absorbent material may be placed into a cylinder with 1/16 inch holes in the bottom, and 60,000 pounds of force may be applied to allow recovery of the petroleum-based product or other contaminant from the absorbent material.

Another method of extraction to remove the petroleum-based product or other contaminant from the absorbent material may include using a radiation machine. In one embodiment, approximately 90-100% of the petroleum-based product may be extracted from the absorbent material using a radiation machine similar to a microwave employed during conventional tire recycling processes. Other extraction methods may be used.

Testing has revealed that the absorbent material will absorb petroleum-based products, such as oil, with little to no water absorption. As an example of water to product, in one test, 8 grams of absorbent material, after 15 minutes of deployment in a oil-water mixture, yielded 8.9 grams of total weight of material still having buoyancy. The test also revealed that subsurface deployment can be achieved.

In another test, an oil slick was simulated in a beaker of water. A salt-water equivalent of 2.2 pounds per gallon of water was used in the beaker. 145 weight gear oil was poured into the beaker to simulate an oil slick of between a quarter-of-an-inch to half-an-inch thick in size. When the absorbent material was placed on top of the simulated oil slick, the absorbent material immediately started to soak the oil from the water.

Five minutes into the test, approximately forty percent of the oil was soaked up by the absorbent material. Ten minutes into the test, approximately ninety-five percent of the oil was soaked up by the absorbent material. After fifteen minutes, all of the oil was absorbed by the absorbent material. In sum, testing has established that the absorbent material may quickly absorb a petroleum-based contaminant from water.

V. Exemplary Absorbent Material

FIG. 1 illustrates an exemplary sheet of absorbent material 100 configured to absorb petroleum-based products or other contaminants with little or no water absorption. The sheet of absorbent material 100 may have a thickness 102, a length 104, and a width (into FIG. 1). The sheet of absorbent material 100 may include additional, alternative, or fewer dimensions.

The thickness 102 of the sheet of absorbent material 100 may be between approximately one inch and approximately two inches thick. In one embodiment, the thickness 102 of the sheet of absorbent material 100 corresponds to the thickness of the contaminant spill floating near the top of a body of water. The thickness 102 of the shhet of absorbent material 100 may be altered to enhance effectiveness of reclaiming the contaminant, while not wasting excessive absorbent material. Other thicknesses may be used.

The length 104 of the sheet of absorbent material 100 may range in size from less than one, to several, to even hundreds of feet long. The absorbent material 100 may be transferred to a spill area as a roll and then rolled onto the surface of a contaminated body of water.

The width (not shown) of the sheet of absorbent material 100 may range in size from less than one, to several, to even hundreds of feet long. In one embodiment, the absorbent material 100 may be a roll having a width of either four or eight feet. Additional, fewer, or alternate thickness, length, and/or width dimensions may be used.

The absorbent material 100 may be the polymer-based plastic material disclosed herein. In one embodiment, the absorbent material may include a composition the same as that shown in Table I. In one aspect, the absorbent material 100 may include material having smaller sieve sizes ranging from 16 to 100, material having larger sieve sizes ranging from 4 to 10, and any combination of material having both small and large sieve sizes. In another embodiment, the sheet of absorbent material may include small and/or large disks or squares of absorbent material. The absorbent material may include alternate material configurations.

VI. Exemplary Methods of Deployment of Large Sheets of Absorbent Material

Figure 2:
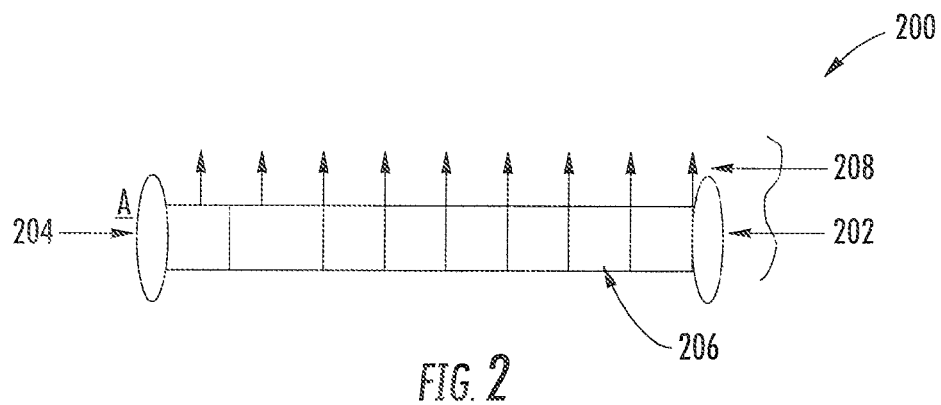
FIGS. 2-5 illustrate exemplary methods of deployment of a sheet of absorbent material.

FIGS. 2-5 illustrate exemplary methods of deployment of large sheets of absorbent material. FIG. 2 illustrates a slow drag and tow method 200. The method 200 may include stringing a length of a sheet of absorbent material 206 between two vessels 202, 204. The two vessels 202, 204 may be traveling on the same heading 208 and at the same speed, such as 4 knots or less. Moving the absorbent material slowly through the water may facilitate absorption. The two vessels 202, 204 may be held together by one or more lines or cables to reduce stress on the absorbent material stretched between the vessels 202, 204.

Figure 3:
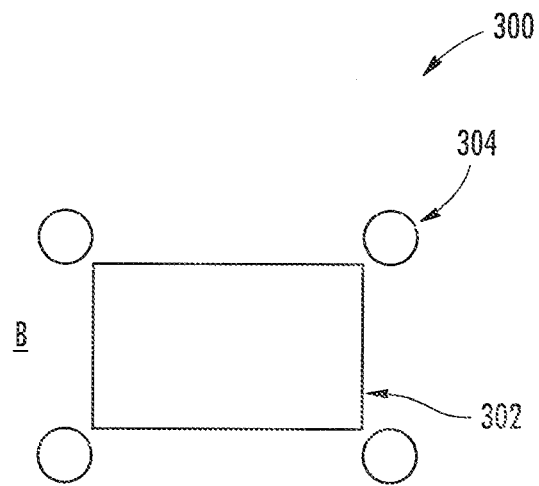

FIG. 3 illustrates a buoyed method 300. The method 300 may include attaching a sheet of absorbent material 302 between four buoys 304. The buoys 304 may facilitate keeping the absorbent material in relatively the same area to enhance absorption of the contaminant from the water.

Figure 4:
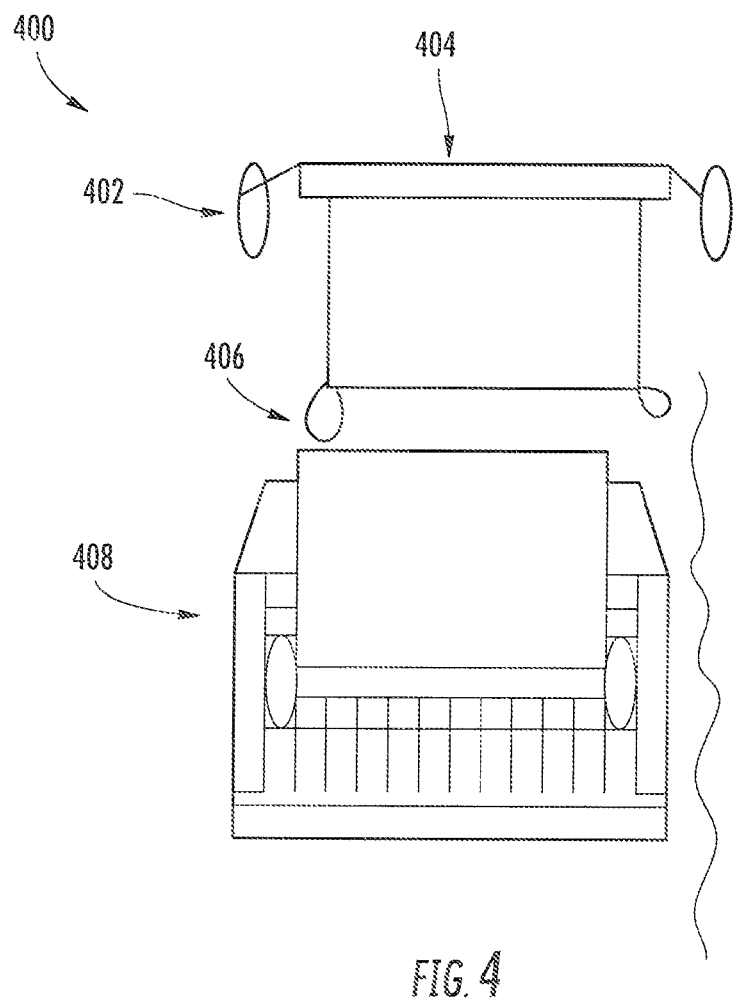

FIG. 4 illustrates a roll deployment method 400. Two lead vessels 402 may hold a roll of absorbent material 404 between themselves, such as via lines or other attachments. The absorbent material 404 may be unrolled onto the surface of a body of water as the two lead vessels 402 move forward through the water.

The absorbent material 404 may have one or more hooks 406 on the front edge. A trailing vessel or barge 408 may be able to hook the loops for retrieval. The trailing vessel 408 may have a grate and winch attachment. The absorbent material 404 may be winched in over the grate on the trailing vessel 408 to catch any leeching that may or may not occur.

Figure 5:
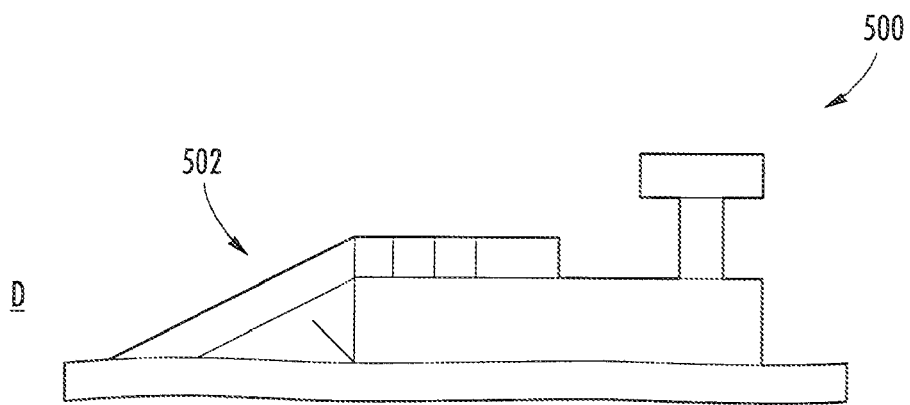

FIG. 5 illustrates a modified harvester method 500. The method 500 may include modifying a seaweed or other harvester 502 to be configured to deploy and/or retrieve absorbent material. Additional or alternate methods of deployment for large sheets of absorbent material may be used.

VII. Exemplary Methods of Deployment of Loose or Small Sheet Absorbent Material

Figure 6:
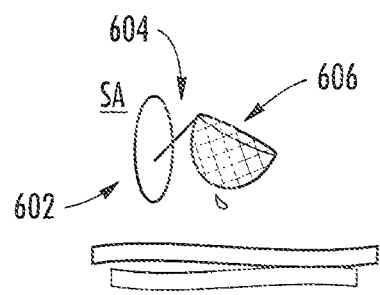
FIGS. 6-8 illustrate exemplary methods of deployment for loose absorbent material and/or smaller sheets comprising disks, squares, spheres, or other shapes.
Figure 7:
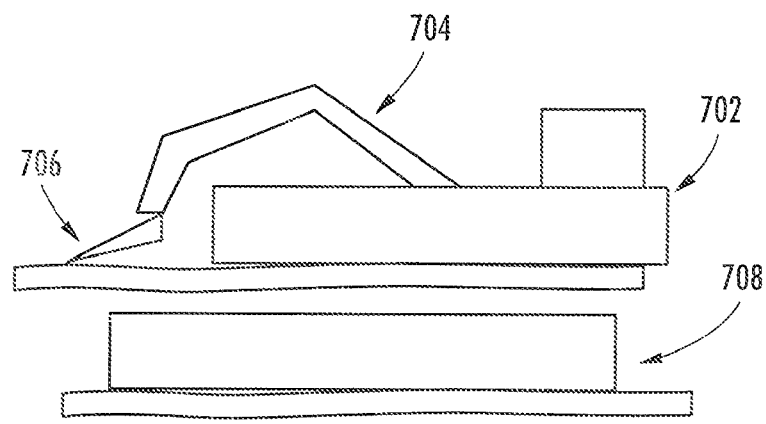
Figure 8:
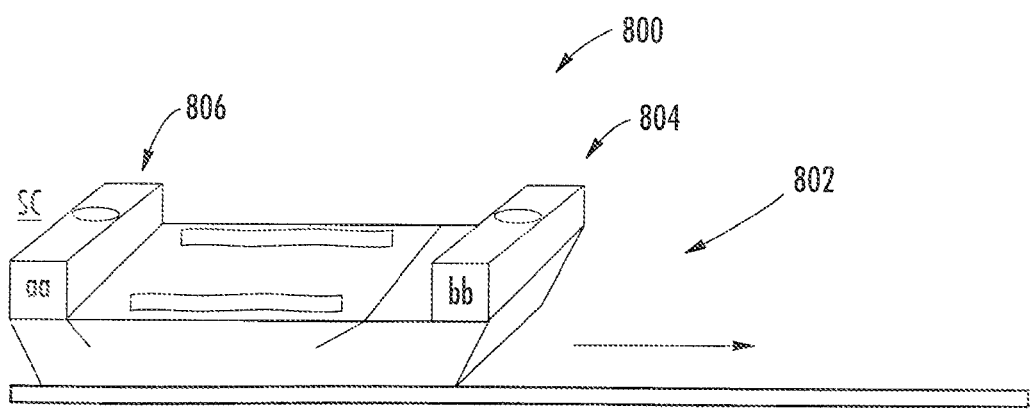

FIGS. 6-8 illustrate exemplary methods of deployment for loose sieve material and/or smaller sheets of absorbent material. Loose material and/or small sheets having sieve sizes ranging from approximately 4 to approximately 100 may be deployed via ship, plane, or manually. Once the material has been deployed for a sufficient time to have become saturated with the contaminant and absorbed at least a portion of the contaminant, the loose or small sheet absorbent material may be retrieved in various manners.

FIG. 6 illustrates an exemplary net retrieval method 600. The method 600 may include a retrieval vessel 602 having a netting 606 attached to an arm 604. The arm 604 may be configured to open, close, lower, and/or raise the netting 606 into and out of the water. The netting material may be stretched over the application area to retrieve absorbent material containing contaminants.

FIG. 7 illustrates an exemplary scoop retrieval method 700. The method 700 may include employing a vessel 702 that is a boat, a modified barge, or other holding vessel. The vessel 702 may include a 360 degree crane 704 with a scoop 706. The crane 704 may be configured to move the scoop 706 below the surface of the water and retrieve contaminant saturated absorbent material from the surface of the water and/or below the surface of the water. The vessel 702 may have a vacuum device that may provide a suction action on the absorbent material to facilitate retrieval from the water. The retrieved absorbent material may be placed into a container on the vessel 702, or on a dedicated vessel or barge 708 for holding the contaminated material.

FIG. 8 illustrates a single-pass deployment method 800. The method 800 may involve a control vessel towing a device 802 that includes a deployment compartment 804 and a holding compartment 806. The device 802 may be an all-in-one unit designed to deploy and retrieve absorbent material in a short period of time, such as in 15 to 30 minute intervals, or other relatively short periods of time. The device 802 may be configured to dispense the absorbent material in a needed thickness over the contaminated area. Once the absorbent material is deployed, the same device 802 may be configured to retrieve the absorbent material after the desired time interval, such as 15 minutes, has passed.

The deployment compartment 804 may be configured to hold and then dispense the absorbent material at sea. The absorbent material may be held as a roll on a rotating dispenser, similar to the manner in which a roll of paper towels is stored and dispensed. The holding compartment 806 may be used to retrieve the absorbent material, such as by using a manually operated scrapper blade to grab the contaminant saturated material. The scrapper blade may then be configured to push and/or pull the material into the holding compartment for storage, transfer, and/or reclamation of contaminant from the absorbent material.

VIII. Exemplary Tug-Barge Arrangements

Figure 9:
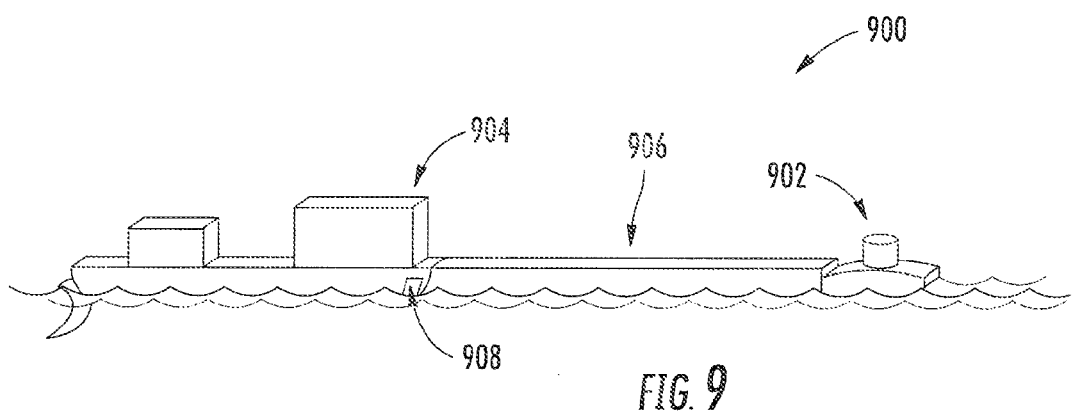
FIG. 9 illustrates an exemplary tug-barge arrangement for deploying and/or retrieving the absorbent material.

FIG. 9 illustrates an exemplary tug-barge arrangement for deploying and/or retrieving the absorbent material 900. The arrangement 900 may include a tug or control vessel 902 and a barge 904. The control vessel 902 may pull the barge or other container vessel 904 via conventional means or lines 906. The barge/containment vessel 904 may have heavy hauling capabilities, or may have a grate and winch set-up. The barge 904 may have bumpers to prevent potential damage from impact with the control vessel 904, other vessels, or a dock.

Figure 10:
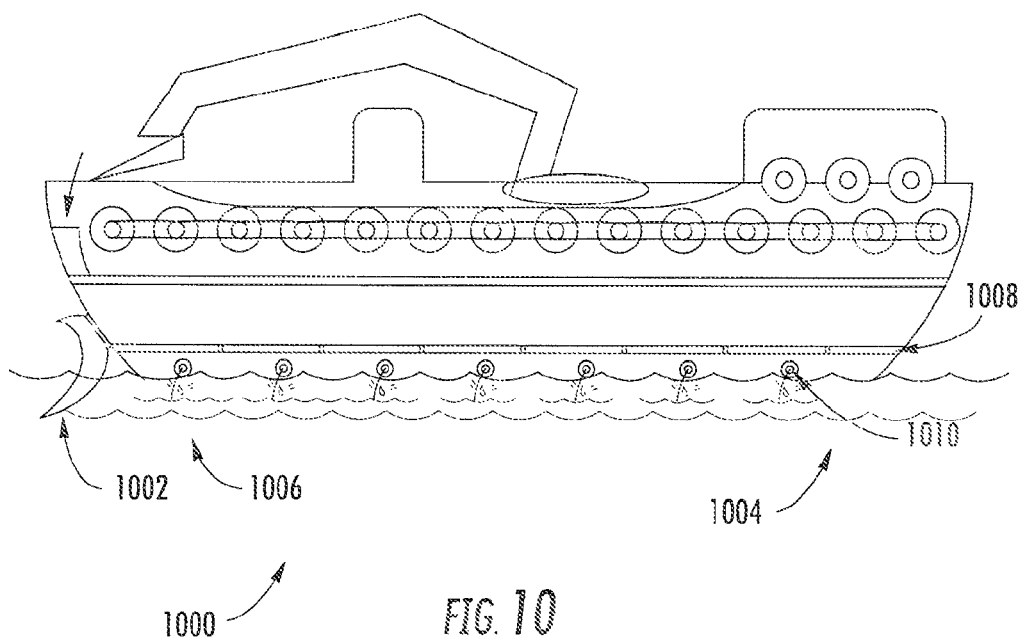
FIG. 10 illustrates an exemplary barge configured for deploying and/or retrieving the absorbent material.

FIG. 10 illustrates an exemplary barge configured for deploying and/or retrieving absorbent material 1000. The barge 1000 may be configured to deploy absorbent material and retrieve saturated absorbent material simultaneously, such as discussed with respect to FIG. 8. The barge 1000 may include a manually operated scrapper 1002 that collects contaminant saturated absorbent material after a period of deployment, such as 10, 15, 20, 30, or 60 minutes. The barge 1000 may be configured to have a means for pushing or moving the absorbent material slowly to the rear of the barge 1000 and/or along the bottom of the barge 1000 and in the contaminated water, such as a conveyor belt or other means.

By the time the absorbent material has traveled from the bow 1004 of the barge 1000 to the stern 1006 of the barge 1000, the absorbent material may have become saturated with contaminant. The barge 1000 may be configured to retrieve and/or suction up the absorbent material from the water and place the material into a separate container near the stern 1006 of the barge 1000. For instance, the barge 1000 may include the scrapper 1002 at the aft end and/or a 360 degree crane with an attached vacuum or scoop for retrieving absorbent material. Additionally or alternatively, the barge 1000 may include a claw to facilitate retrieval. The claw may be configured to alleviate the impact of waves on the retrieval operation, and may have a wide suction attached for skimming the surface of the water for absorbent material.

The barge 1000 may be large enough to house a squeezing device that extracts a petroleum-based product from the retrieved absorbent material. The barge 1000 may be configured to transfer the extracted petroleum-based product to a tanker for transport.

To further help with clean up efforts, the barge 1000 may also include extra filtration 1008 before water and oil removal from a contaminated body of water. The barge 1000 may be configured with many tanks holding the absorbent, and pumps to extract water and oil from a contaminated body of water and pump the water and oil mixture into the tanks on the vessel. The absorbent material in the tanks may then absorb oil with little to no water absorption. All or substantially all of the water from the original water-oil mixture may then be discharged 1010 at the rear of the vessel and/or near the water line of the barge 1000. Before discharge from the vessel to the body of water, the water may be further filtered and/or cleaned via filters and/or chemicals.

Figure 11:
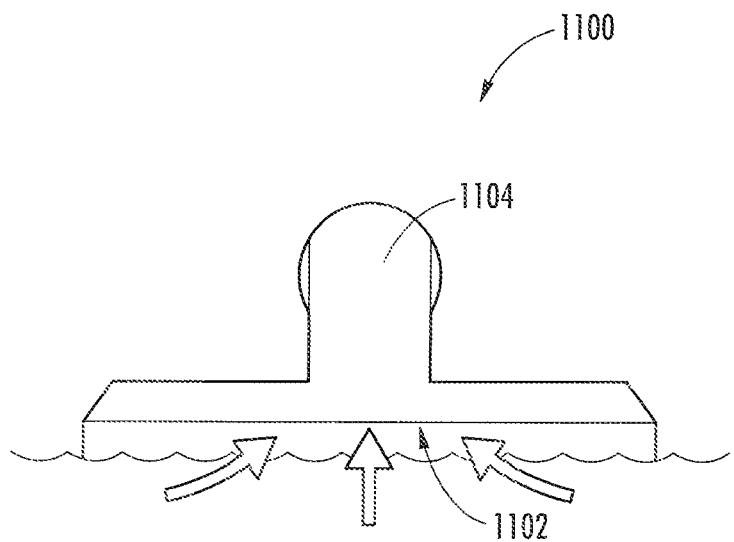
FIG. 11 illustrates an exemplary suction attachment for recovering deployed sheets absorbent material.

FIG. 11 illustrates an exemplary suction attachment or vacuuming means 1100 for recovering deployed sheets and/or disks of absorbent material. The suction attachment or vacuuming means 1100 may have a wide mouth 1102 that creates a pressure vacuum or pressure differential near the surface of the water and sucks saturated absorbent material into the barge or other containment vessel. The wide mouth 1102 may be configured to be several feet in length and between a few inches and a few feet wide. The wide mouth 1102 may funnel the absorbent material into a central tubing 1104 for raising the absorbent material up out of the water and onto the barge. The central tubing 1104 may also include a pressure differential for transferring or moving the absorbent material into a holding container, or to the vicinity of a claw or other grabbing means that will then move the absorbent material to a holding container. The suction attachment may include additional, fewer, or alternate components.

IX. Exemplary Method of Extracting Contaminants Via Absorbent Material

Figure 12:
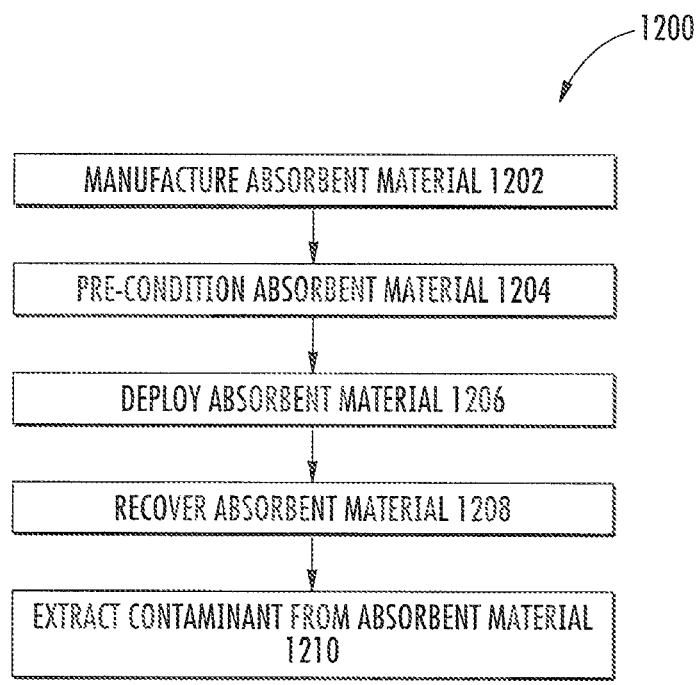
FIG. 12 illustrates a flow chart of an exemplary method of extracting contaminants from the environment via the absorbent material with little to no absorption of water.

FIG. 12 illustrates a flow chart of an exemplary method of extracting contaminants from the environment via the absorbent material with little to no water absorption 1200. The method of extraction 1200 may include manufacturing absorbent material 1202, pre-conditioning the absorbent material 1204, deploying the absorbent material 1206, recovering the absorbent material 1208, and extracting contaminant from the absorbent material 1210. The method may include additional, fewer, or alternate actions.

The method of extraction 1200 may include manufacturing absorbent material 1202. The absorbent material 1202 may be manufactured as a PVC polymer-based plastic, as discussed herein. The absorbent material 1202 may be manufactured as a large sheet of polymer-based plastic having a thickness of approximately one inch to approximately two inches. Alternatively, the absorbent material 1202 may be manufactured as disks or patches of material, such as a squares ranging in dimension from a one or more inches in size to one or more feet. For instance, the disks or patches of absorbent material may be two inch by two inches patches.

The absorbent material may have small sieve sizes ranging from approximately 16 to approximately 100. Alternatively or additionally, the absorbent material may have large sieve sizes ranging from approximately 4 to approximately 10. Alternate absorbent material may be employed.

The method of extracting a contaminant from water with little to no absorption of water 1200 may include pre-conditioning the absorbent material 1204. Either a large sheet of polyvinyl chloride (PVC) polymer-based plastic for extracting a contaminant from a body of water or patches or disks (small sheets) or spheres of the same type of material may be preconditioned. The absorbent material may be pre-conditioned by cutting the PVC polymer-based plastic to open the absorption pores of the large sheet and/or disks of PVC polymer-based plastic to facilitate absorption of the contaminant by the large sheet and/or disks of PVC polymer-based plastic. The large sheet and/or disks of PVC polymer-based plastic may comprise at least approximately seventy percent PVC polymer and have a thickness of between approximately one inch and approximately two inches.

The method of extracting a contaminant from water with little to no absorption of water 1200 may include deploying the large sheet and/or disks of PVC polymer-based plastic onto the body of water containing the contaminant 1206. The method described elsewhere herein may be used. Deployment methods with additional, fewer, or alternate actions may be used.

The method of extracting a contaminant from water with little to no absorption of water 1200 may then include waiting a sufficient period of time to allow the large sheet and/or disks of PVC polymer-based plastic to absorb a portion of the contaminant from the body of water with little to no water absorption and while the large sheet and/or disks of PVC polymer-based plastic remain(s) buoyant or substantially buoyant.

Subsequently, the method of extracting a contaminant from water with little to no absorption of water 1200 may include recovering the large sheet and/or disks or spheres of PVC polymer-based plastic from the body of water after the large sheet and/or disks or spheres of PVC polymer-based plastic has absorbed at least a portion of the contaminant 1208 such that the portion of the contaminant absorbed by the large sheet and/or disks or spheres of PVC polymer-based plastic is extracted from the body of water with little to no absorption of water by the large sheet and/or disks or spheres of PVC polymer-based plastic. In one embodiment, the large sheet and/or disks or spheres of PVC polymer-based plastic may be recovered onto a vessel using a vacuum means or a suction arrangement that vacuums the large sheet and/or disks or spheres of PVC polymer-based plastic from the body of water and onto the vessel.

The method of extracting a contaminant from water with little to no absorption of water 1200 may include extracting at least a percentage of the portion of the contaminant absorbed by the large sheet and/or disks or spheres of PVC polymer-based plastic after the sheet of PVC polymer-based plastic has been recovered from the body of water. In one embodiment, the contaminant may be extracted from the absorbent material by applying force to the large sheet and/or disks or spheres of PVC polymer-based plastic.

In one embodiment, the method of extracting a contaminant from water with little to no absorption of water 1200 may include deploying the absorbent material. In one embodiment, the contaminant extracted from water may be a petroleum-based product. In another embodiment, the large sheet and/or disks of PVC polymer-based plastic comprises sieve sizes between approximately sixteen and approximately one-hundred to facilitate absorption and holding of the petroleum-based product by the large sheet and/or disks or spheres of PVC polymer-based plastic.

The method of extracting a contaminant from water with little to no absorption of water 1200 may include deploying a barge or containment vessel with one or more tanks onboard for holding fluid, such as a mixture of water and oil. The tanks may be pre-filled or partially pre-filled with absorbent material, such as the absorbent material in the form of sheets, disks, patches, spheres, globes, and other shapes. An oil-water mixture may be sucked from a contaminated body of water using pumps. The pumps and associated hosing may or may not be equipped with fine or other filters that collect globes of petroleum-based products and/or tar balls.

Alternatively, large clumps of petroleum-based products may be collected once the oil-water mixture is pumped into the onboard tank(s) containing the absorbent material. After which, the absorbent material may be added to the onboard tank(s). Other collection methods may be used.

Once the oil-water mixture is collected onboard, the absorbent material may separate or substantially separate the oil from the water, such as by absorbing oil with little to no water absorption. The water may then be sent through a filtration and/or chemical process, and be released back into the body of water—which may lower the requisite storage capacity of the onboard tanks and may allow for substantially continuous onboard removal operations at sea that are not limited by tank capacity. On the other hand, the absorbent material may be collected from the tanks and either stored for processing on land, another vessel, and/or onboard. Oil or other petroleum—based products may be removed from the absorbent material in the manners described herein. Other removal manners may be used to collect the absorbed oil for re-use.

Figure 13:
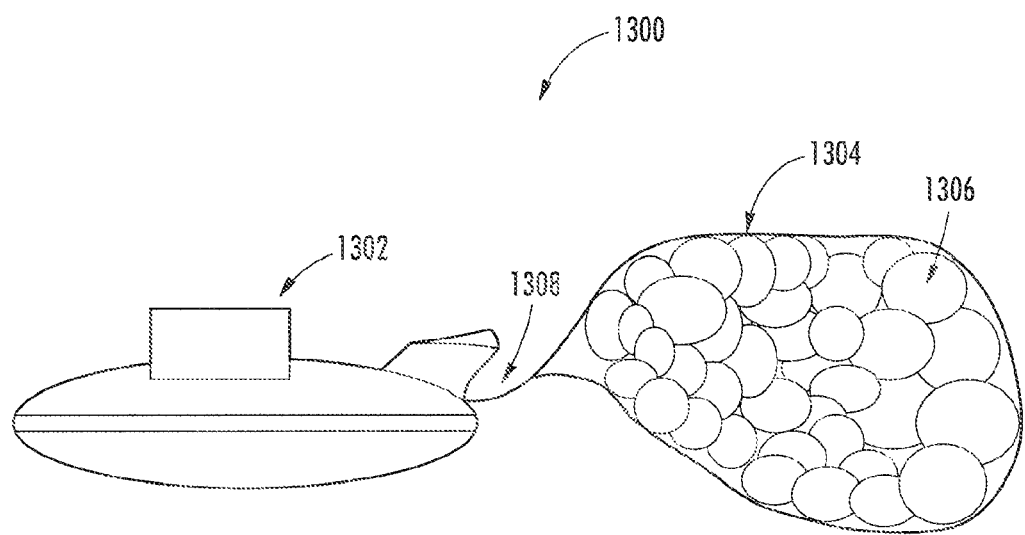
FIG. 13 illustrates an exemplary manner of submarine deployment of absorbent material and retrieval of petroleum-based product from a contaminated body of water.

The method of extracting a contaminant from water with little to no absorption of water 1200 may include subsurface deployment of absorbent material. For instance, the method 1200 may include deploying submarines or other vehicles that operate below the surface of a contaminated body of water. FIG. 13 illustrates an exemplary manner of submarine deployment of absorbent material and retrieval of petroleum-based product from a contaminated body of water.

FIG. 13 illustrates that a submarine 1302 may drag a net 1304 via a drag line 1308. The net 1304 may hold absorbent material 1306. The submarine 1302 may be able to facilitate removal of patches or large fields of oil that have collected below the surface of the body of water. The submarine 1302 may hover or move slowly through a field of substantially all oil to allow the towed absorbent material 1306 to more readily absorb oil. Once the absorbent material 1306 is substantially saturated with oil, the submarine 1302 may tow the absorbent material 1306 to a containment vessel or barge residing on the surface.

In one embodiment, the submarine 1302 may drag absorbent material 1306 via a net 1304. Alternatively, the submarine 1302 may drag a sheet of absorbent material through oil contaminated water. The submarine 1302 may be used to identify thick patches of subsurface oil, which may not be visible from surface vessels. The submarine 1302 may be used to break-up or disperse thick patches of subsurface oil such that the oil may rise to the surface of the water, facilitating clean up on the surface.

The submarine 1302 may be used to disperse large pieces of absorbent material, small pieces of absorbent material, or loose absorbent material. The absorbent material may slowly rise to the surface of the contaminated body of water while simultaneously gathering/absorbing oil. Once on the surface and saturated with oil, the absorbent material may be collected via surface vessels, air planes, helicopters, barges, and/or the submarine 1302. For instance, water or airborne vessels may use nets to collect saturated absorbent material and move it to large, local containment vessels.

In one aspect, the absorbent material may absorb a petroleum-based product with little to no water absorption. In one embodiment, the absorbent material may absorb oil from an oil-water mixture with approximately less than twenty percent of the material absorbed by the absorbent material comprising water. In another embodiment, the absorbent material may absorb oil from an oil-water mixture with approximately less than ten percent, or approximately less than five percent, of the material absorbed by the absorbent material comprising water. In another embodiment, the absorbent material may absorb oil from a oil-water mixture with approximately less than one percent of the material absorbed by the absorbent material comprising water.

While several arrangements of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

While the invention has been described above by reference to various embodiments, it should be understood that many changes and modifications can be made without departing from the scope of the invention. The description and illustrations are by way of example only. Many more embodiments and implementations are possible within the scope of this invention and will be apparent to those of ordinary skill in the art. The various embodiments are not limited to the described environments and have a wide variety of applications.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

What is claimed is:

1. An absorbent material for the removal of petroleum-based products from water with little to no water absorption, the absorbent material comprising:
    a sheet of polyvinyl chloride (PVC) polymer-based plastic, the sheet of PVC polymer-based plastic comprising at least approximately seventy percent PVC polymer with the remainder including a non-zero percentage of both inert filler and a process aid which is an acrylic compound,
    wherein the sheet of PVC polymer-based plastic has a thickness of between approximately one inch and approximately two inches and is configured to float on water, and the sheet of PVC polymer-based plastic further comprising particulates having sieve sizes between approximately sixteen and approximately one-hundred such that when the sheet of PVC polymer-based plastic is deployed on top of a body of water containing a petroleum-based product, the sheet of PVC polymer-based plastic will absorb the petroleum-based product from the body of water with little to no water absorption and retain the petroleum-based product for at least approximately thirty minutes before the sheet of PVC polymer-based plastic will lose buoyancy to allow for recovery of the sheet of PVC polymer-based plastic from the body of water.

2. The absorbent material of claim 1, the sheet of PVC polymer-based plastic further being pre-conditioned by a saw such that absorption pores in the sheet of PVC polymer-based plastic are opened to facilitate the absorption of the petroleum-based product by the sheet of PVC polymer-based plastic.

3. The absorbent material of claim 1, the sheet of PVC polymer-based plastic further comprising particulates having sieve sizes of approximately four and approximately ten, the particulates having sieve sizes of approximately four and approximately ten configured to transfer the petroleum-based product to the top of the sheet of PVC polymer-based plastic.

4. The absorbent material of claim 1, the sheet of PVC polymer-based plastic holds the absorbed petroleum-based product for retrieval, the sheet of PVC polymer-based plastic being capable to release the absorbed petroleum-based product upon an application of a force being applied to the sheet of PVC polymer-based plastic.

5. The absorbent material of claim 1, the sheet of PVC polymer-based plastic further comprising a non-zero percentage of both a heat stabilizer and a lubricant, and the sheet of PVC polymer-based plastic comprises a disk or square shape.

6. The absorbent material of claim 1, wherein the inert filler comprises between approximately one percent and approximately thirty percent $CaCO_3$ or $TiO_2$.

7. A method of extracting a petroleum-based product from water with little to no absorption of water, the method comprising:
    deploying a sheet of polyvinyl chloride (PVC) polymer-based plastic configured to float on water onto a body of water containing a petroleum-based product, the sheet of PVC polymer-based plastic comprising at least approximately seventy percent PVC polymer and having a thickness of between approximately one inch and approximately two inches, the sheet of PVC polymer-based plastic further comprising particulates having sieve sizes between approximately sixteen and approximately one-hundred such that when the sheet of PVC polymer-based plastic is deployed on top of the body of water containing the petroleum-based product, the sheet of PVC polymer-based plastic will absorb the petroleum-based product from the body of water with little to no water absorption while the sheet of PVC polymer-based plastic remains buoyant;

waiting a sufficient period of time to allow the sheet of PVC polymer-based plastic to absorb a portion of the petroleum-based product from the body of water; and recovering the sheet of PVC polymer-based plastic from the body of water after the sheet of PVC polymer-based plastic has become at least partially saturated with the petroleum-based plastic such that the portion of the petroleum-based product absorbed by the sheet of PVC polymer-based plastic is extracted from the body of water.

8. A method of extracting a petroleum-based product from water of claim 7, the method further comprising pre-conditioning the sheet of PVC polymer-based plastic for petroleum-based product absorption by cutting the sheet of PVC polymer-based plastic to open absorption pores of the sheet of PVC polymer-based plastic and facilitate absorption of the petroleum-based product by the sheet of PVC polymer-based plastic.

9. A method of extracting a petroleum-based product from water of claim 7, the method further comprising extracting at least a percentage of the portion of the petroleum-based product absorbed by the sheet of PVC polymer-based plastic after the sheet of PVC polymer-based plastic has been recovered from the body of water by applying force to the sheet of PVC polymer-based plastic.

10. A method of extracting a petroleum-based product from water of claim 7, wherein the sheet of PVC polymer-based plastic further comprises particulates having sieve sizes between approximately four and approximately ten, the particulates having sieve sizes between approximately four and approximately ten configured to transfer the petroleum-based product in the body of water onto the top of the deployed sheet of PVC polymer-based plastic.

11. A method of extracting a contaminant from water with little to no absorption of water, the method comprising:

pre-conditioning a sheet of polyvinyl chloride (PVC) polymer-based plastic for extracting a contaminant from a body of water by cutting the sheet of PVC polymer-based plastic to open absorption pores of the sheet of PVC polymer-based plastic to facilitate absorption of the contaminant by the sheet of PVC polymer-based plastic, the sheet of PVC polymer-based plastic comprising at least approximately seventy percent PVC polymer and having a thickness of between approximately one inch and approximately two inches;

deploying the sheet of PVC polymer-based plastic onto the body of water containing the contaminant;

waiting a sufficient period of time to allow the sheet of PVC polymer-based plastic to absorb a portion of the contaminant from the body of water with little to no water absorption and while the sheet of PVC polymer-based plastic remains buoyant; and recovering the sheet of PVC polymer-based plastic from the body of water after the sheet of PVC polymer-based plastic has absorbed at least a portion of the contaminant such that the portion of the contaminant absorbed by the sheet of PVC polymer-based plastic is extracted from the body of water with little to no absorption of water by the sheet of PVC polymer-based plastic.

12. The method of extracting a contaminant from water of claim 11, wherein the contaminant is a petroleum-based product.

13. The method of extracting a contaminant from water of claim 11, wherein the sheet of PVC polymer-based plastic further comprises particulates having sieve sizes between approximately sixteen and approximately one-hundred to facilitate absorption and holding of the contaminant by the sheet of PVC polymer-based plastic.

14. The method of extracting a contaminant from water of claim 11, the method further comprising extracting at least a percentage of the portion of the contaminant absorbed by the sheet of PVC polymer-based plastic after the sheet of PVC polymer-based plastic has been recovered from the body of water by applying force to the sheet of PVC polymer-based plastic.

15. The method of extracting a contaminant from water of claim 11, wherein the sheet of PVC polymer-based plastic is deployed in conjunction with a dispersal agent, and the sheet of PVC polymer-based plastic comprises a disk or square shape.

16. The method of extracting a contaminant from water of claim 11, wherein the sheet of PVC polymer-based plastic is recovered onto a vessel using a suction arrangement that vacuums the sheet of PVC polymer-based plastic from the body of water and onto the vessel.

17. A method of extracting a contaminant from water with little to no absorption of water, the method comprising:

deploying a sheet of polyvinyl chloride (PVC) polymer-based plastic configured to float on water onto a body of water containing a contaminant, the sheet of PVC polymer-based plastic comprising compressed particulates having sieve sizes between approximately four and approximately ten and a thickness of approximately equal to or greater than a thickness of contaminants in the body of water such that when the sheet of PVC polymer-based plastic is deployed on top of the body of water containing the contaminant, the sheet of PVC polymer-based plastic absorbs the contaminant from the body of water with little to no water absorption while remaining buoyant;

waiting a sufficient period of time to allow the sheet of PVC polymer-based plastic to absorb at least a portion of the contaminant from the body of water; and recovering the sheet of PVC polymer-based plastic from the body of water after the sheet of PVC polymer-based plastic has absorbed at least a portion of the contaminant with little to no absorption of water such that the portion of the contaminant absorbed by the sheet of PVC polymer-based plastic is removed from the body of water.

18. The method of extracting a contaminant from water of claim 17, wherein the sheet of PVC polymer-based plastic further comprises particulates having sieve sizes between approximately sixteen and one-hundred to facilitate absorption and holding of the contaminant by the sheet of PVC polymer-based plastic when the sheet of PVC polymer-based plastic is deployed on top of the body of water.

19. The method of extracting a contaminant from water of claim 17, wherein the contaminant is a petroleum-based product, and the method further comprising extracting at least a percentage of the portion of the petroleum-based product absorbed by the sheet of PVC polymer-based plastic after the sheet of PVC polymer-based plastic has been recovered from the body of water by applying force to the sheet of PVC polymer-based plastic.

20. The method of extracting a contaminant from water of claim 17, the recovery of the sheet of PVC polymer-based plastic from the top of the body of water being performed via a vacuum means for vacuuming the sheet of PVC polymer-based plastic from the top of the body of water.

* * * * *